G. & J. BERNERT.
CONVEYER.
APPLICATION FILED AUG. 11, 1915.

1,200,699.

Patented Oct. 10, 1916.

Inventors
George Bernert
Jacob Bernert

Witness:

UNITED STATES PATENT OFFICE.

GEORGE BERNERT AND JACOB BERNERT, OF MILWAUKEE, WISCONSIN.

CONVEYER.

1,200,699.     Specification of Letters Patent.     Patented Oct. 10, 1916.

Application filed August 11, 1915. Serial No. 44,945.

*To all whom it may concern:*

Be it known that we, GEORGE BERNERT and JACOB BERNERT, both citizens of the United States, and residents of Milwaukee, in the county of Milwaukee and State of Wisconsin, have invented certain new and useful Improvements in Conveyers; and we do hereby declare that the following is a full, clear, and exact description thereof.

This invention relates to the subject of pneumatic conveyers of the type that are used in loading grain and the like into elevators, cars, and the like, and the primary aim of the invention is to produce a conveyer of the type ntioned in which the grain or other material may be discharged from the wagon other conveyance direct into the conveyer and by said conveyer discharged direct into the elevator, car or other place.

The invention contemplates in its broader aspect a conveyer that projects upwardly and has its inlet in the form of a hopper disposed at its lowest end, the outlet of the conveyer being at its highest end and which coöperates with an upwardly projecting blower trunk ha ing an upper inlet opening in direct communication with the upper outlet of the trunk, the arrangement being such that the grain or other material is discharged into the trunk above the blower so that the blower forces the grain or other material upwardly; such arrangement being of special utility in that it facilitates conveying grain and other material that is delivered to the conveyer at a low level, such for instances as from a vehicle, basement of an elevator, and discharged at a high level, such as to upper portions of a storage building.

In producing a conveyer capable of performing the functions generally stated above, it will be understood that the essential features thereof are susceptible to changes in details and structural arrangements, simple and practical embodiments of which are shown in the accompanying drawings, wherein—

Figure 1:
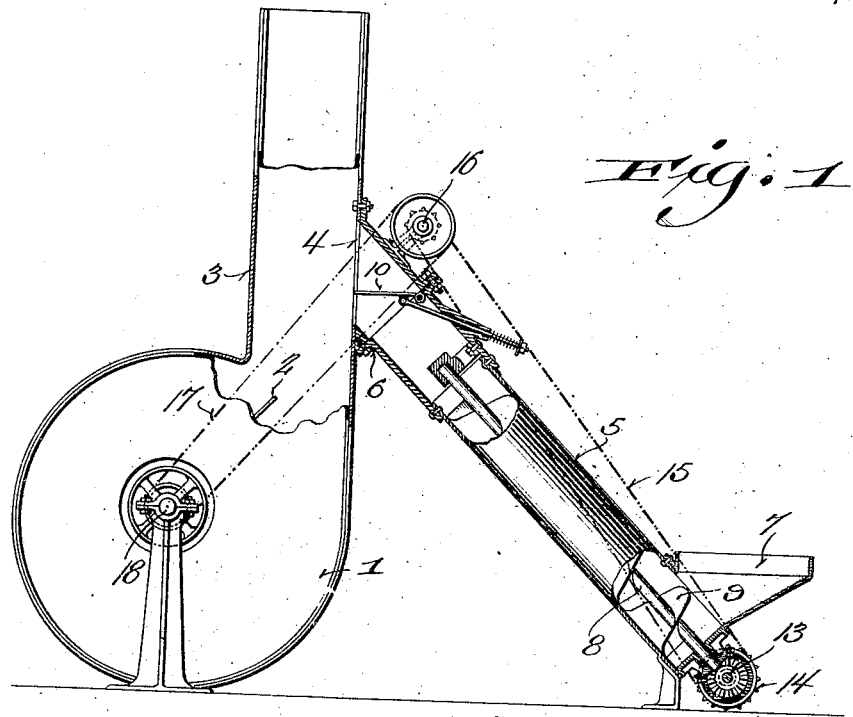
Figure 2:
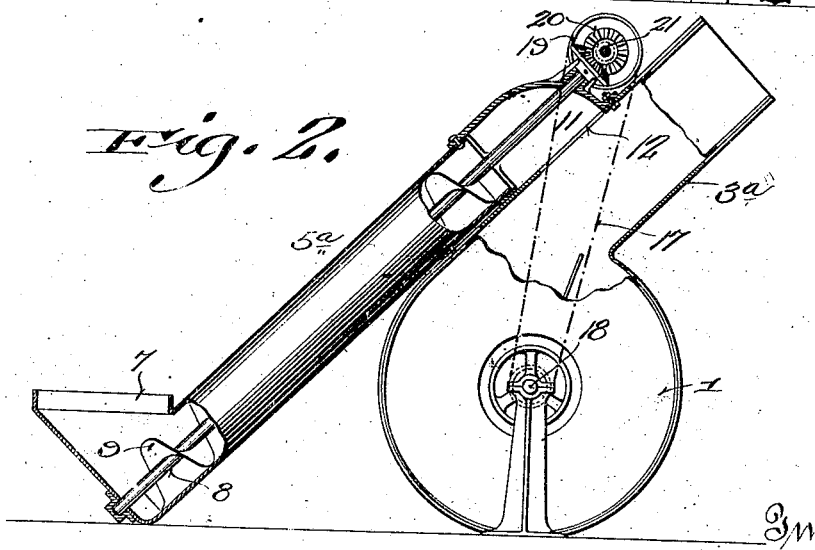

Figure 1 is a central vertical sectional view of a conveyer constructed in accordance with one form of the invention. Fig. 2 is a similar view showing another form of the invention.

Referring to the accompanying drawings by numerals, and particularly to Fig. 1 of the same, it will be seen that the improved conveyer comprises in its general organization a fan casing 1 having a fan or blower 2 therein, a trunk 3 being in communication with the casing 1 and projecting upwardly. The trunk 3 at a point above the junction of said trunk and the casing 1 is provided with a side opening 4 for the admission of grain or other material. A conveyer drum 5 is disposed at an oblique angle relative to the trunk 3, the open upper end of the drum being flanged, as indicated at 6 and suitably fastened to the edges of the trunk 3 surrounding the opening 4. At its lower end portion the drum 5 is provided with a horizontally disposed hopper 7, the extreme lower end of the drum being closed. A conveyer shaft 8 is suitably journaled in the drum 3 and terminates at its upper end below the junction of the upper end of the drum and the trunk 3. A screw conveyer 9 is carried by the shaft 8, the conveyer extending to the lower end of the drum 5 in position to receive the material that is to be elevated directly from the hopper 7. Beyond the upper end of the conveyer, a spring-held valve 10 is hinged within the drum, the valve being of the usual or any convenient type.

In the form of the invention shown in Fig. 2, the trunk 3ª and the drum 5ª are upwardly inclined in parallel relation, the upper discharge outlet end of the drum 5ª being at the side thereof, as indicated at 11, and being in direct communication with the upper side inlet opening 12 of the trunk 3ª.

In both forms of the invention the feed of the material by the conveyer 9 is upward, and the material is discharged into the upper portion of the trunk above the fan or blower, and is forced upward by the air from the blower. The described type of conveyer is of great utility in that the material is handled, or conveyed always in an upward direction, thereby providing means whereby material may be quickly and efficiently transferred from the basement of an elevator into a car, or transferred from a wagon or other vehicle into the upper portion of an elevator.

Any convenient or desirable method may be adopted for operating the conveyer and blower simultaneously. For example, in Fig. 1 the conveyer shaft has been shown projecting beyond the bottom of the drum 5 and equipped with a gear that meshes with a gear on a shaft 13, the shaft 13 also carrying a sprocket 14 having a chain connection 15 with an upper shaft 16 carried by suitable journals on the upper portion of the drum 3, shaft 16 also having a suitable connection such as a belt and pulley connection 17 with the shaft 18 of the blower.

In Fig. 2 the conveyer shaft has been shown journaled in the bottom of the drum 5 and projecting through and above the upper end of said drum. The upper end of the shaft in this form of the invention carries a gear 19 that meshes with a gear 20 on a shaft 21, said shaft having a connection with the blower shaft similar to that described in connection with the form of the invention shown in Fig. 1.

It will be observed from the drawings that the base portions of the conveyer drum and the blower casing are in spaced relation, so that the said drum subserves the functions of a supporting leg for the said drum. The drum, as suggested in Fig. 1 may be provided with feet 22, and as shown in both Figs. 1 and 2, the blower casing may be supported by the standards 23.

We claim as our invention:—

The combination of a blower fan and a hopper disposed below the top of the fan, a blower trunk associated with the fan and extending upwardly directly therefrom, a conveyer casing extending upwardly from the hopper and communicating with the blower trunk above and adjacent the fan and a conveyer in the casing.

In testimony that we claim the foregoing we have hereunto set our hands at Milwaukee, in the county of Milwaukee, and State of Wisconsin, in the presence of a witness.

GEORGE BERNERT.
JACOB BERNERT.

Witness:
  M. E. DOWNEY.